United States Patent
Miyamoto et al.

(10) Patent No.: US 8,613,209 B2
(45) Date of Patent: Dec. 24, 2013

(54) OPTICAL FIBER DRAWING APPARATUS

(75) Inventors: Toshiyuki Miyamoto, Takasago (JP); Norio Fukuhara, Takasago (JP); Keiichi Sakamoto, Kawasaki (JP); Takao Kaneko, Kawasaki (JP)

(73) Assignee: Kobe Steel, Ltd., Kobe-shi (JP)

( * ) Notice: Subject to any disclaimer, the term of this patent is extended or adjusted under 35 U.S.C. 154(b) by 1279 days.

(21) Appl. No.: 11/720,390

(22) PCT Filed: Nov. 22, 2005

(86) PCT No.: PCT/JP2005/021467
§ 371 (c)(1),
(2), (4) Date: May 29, 2007

(87) PCT Pub. No.: WO2006/057251
PCT Pub. Date: Jun. 1, 2006

(65) Prior Publication Data
US 2008/0016917 A1    Jan. 24, 2008

(30) Foreign Application Priority Data

Nov. 26, 2004 (JP) .................................. 2004-343157
Nov. 26, 2004 (JP) .................................. 2004-343165

(51) Int. Cl.
*C03B 37/07* (2006.01)
*C03B 37/01* (2006.01)
*C03B 37/025* (2006.01)
*F27B 1/26* (2006.01)

(52) U.S. Cl.
USPC .................... 65/486; 65/484; 65/485; 65/491

(58) Field of Classification Search
None
See application file for complete search history.

(56) References Cited

U.S. PATENT DOCUMENTS 5,944,865 A * 8/1999 Do et al. ................. 65/381
2003/0024272 A1 * 2/2003 Naka et al. .............. 65/379

FOREIGN PATENT DOCUMENTS

| JP | 10-81538    | 3/1998 |
| JP | 10 81538    | 3/1998 |
| JP | 2000-103649 | 4/2000 |
| JP | 2001 31441  | 2/2001 |
| JP | 2001-31441  | 2/2001 |

OTHER PUBLICATIONS

Office Action issued Feb. 22, 2011, in Japanese Patent Application No. 2005-336519 (with English translation).

* cited by examiner

*Primary Examiner* — Jodi C Franklin
(74) *Attorney, Agent, or Firm* — Oblon, Spivak, McClelland, Maier & Neustadt, L.L.P.

(57) ABSTRACT

In an optical fiber drawing device of the present invention, as an operational parameters corresponding to the real drawing speed in the duration from the moment of starting the operation of the optical fiber drawing device till the moment of reaching the target drawing speed are extracted from operational parameters stored in a operational parameter storage unit and applied to the optical fiber drawing device. The operational parameters include a base preform feeding speed, a target variation of real drawing speed, a gain multiplied by the speed element related with the variation of the real drawing speed, an operation cycle, a drawing furnace temperature, a coating resin pressure to coat the optical fiber, and flow of cooling gaseous helium, etc. The optical fiber drawing device of the present invention capable of a stable drawing control that does not generate hunting or overshoot or the like, while reducing the start-up fiber length (or speed increasing time) in the unsteady state (transient state) operation of the optical fiber drawing device.

12 Claims, 19 Drawing Sheets

OPTICAL FIBER DRAWING APPARATUS

TECHNICAL FIELD

The present invention relates to an optical fiber drawing device that produces an optical fiber from an optical fiber preform. The invention particularly relates to an optical fiber drawing device with the control performance enhanced by varying operational parameters in the operational conditions of the optical fiber drawing device, in response to a momentarily varying drawing speed (real drawing speed during operation of the optical fiber drawing device, and an optical fiber drawing device with a control performance enhanced by continuously varying a target variation of the real drawing speed in response to the drawing speed, and by adjusting a preform feeding speed on the basis of a deviation between the target variation of the real drawing speed and a real variation of the real drawing speed.

BACKGROUND ART

In the optical fiber drawing device that produces an optical fiber, generally, the speed of an optical fiber preform being continuously drawn after heated (namely, drawing speed) in a drawing furnace provided with the optical fiber drawing device is closely related with the quality of an optical fiber produced. Accordingly in the optical fiber drawing device, various improvements for adjusting the drawing speed to an optimum speed have been made to obtain a good quality optical fiber.

Normally, the drawing speed itself is feedback-controlled so that the detected value of an outside diameter of an optical fiber after drawn (bare optical fiber) follows a target value; therefore, the control of the real drawing speed to reach an appropriate speed is indirectly performed by controlling the speed (hereafter, called preform feeding speed) of feeding the optical fiber preform being a drawing object into the drawing furnace and so forth.

In an optical fiber drawing device according to the below patent document 1, for example, a preform feeding speed Vf is calculated by the method shown below; the optical fiber preform is fed into the drawing furnace with the calculated preform feeding speed Vf; and thereby the drawing speed is indirectly controlled to reach an appropriate speed. Hereunder the time t represents a time at an instant of time during drawing, and the drawing speed v(t) represents a real drawing speed at the time t.

In the optical fiber drawing device according to the patent document 1, the speed Vf1 being the base speed of feeding the optical fiber preform into the drawing furnace (hereunder, called base preform feeding speed) is calculated by the following formula (A), based on an outside diameter D of the optical fiber preform (hereunder, called preform diameter), a target diameter d (hereunder, called target fiber diameter) of the optical fiber after drawn (bare optical fiber), and a target drawing speed v1 of the optical fiber. This formula (A) is based on the law of mass conservation being valid between the optical fiber preform supplied and the optical fiber after drawn. Here, the target drawing speed v1 is a drawing speed desirable of acquiring a good quality optical fiber in relation with the coating process being the tail-end process in the steady state operation which is given in advance.

$$Vf1 = v1 \cdot d^2/D^2 \quad (A)$$

Next, a practically set preform feeding speed Vf(t) is calculated by correcting the base preform feeding speed Vf1 calculated by the formula (A), with predetermined corrections ($\Delta Vf1$ and $\Delta Vf2$). Here, the correction $\Delta Vf1$ is calculated by multiplying a difference between the target drawing speed v1 and the real drawing speed v(t) by a predetermined positive coefficient K1. The correction $\Delta Vf2$ is calculated by multiplying a variation per a unit time of the real drawing speed v(t), namely, $V(t)-V(t-\Delta t)$ being an acceleration by a predetermined positive coefficient K2.

The practically set preform feeding speed Vf(t) is calculated by the following formula (B), which subtracts the correction $\Delta Vf2$ from the result of adding the correction $\Delta Vf1$ to the above base preform feeding speed Vf1.

$$Vf(t) = Vf1 + \Delta Vf1 \cdot \Delta Vf2 = v1 \cdot d^2/D^2 + K1(v1 - V(t)) - K2(v(t) - v(t-\Delta t)) \quad (B)$$

By setting the preform feeding speed Vf according to this formula (B) the real drawing speed v(t) is indirectly controlled to follow the target drawing speed v1. In concrete, as the real drawing speed v(t) falls below the target drawing speed v1, the preform feeding speed Vf is accelerated according to the formula (B); consequently, the eluted quantity of the optical fiber preform increases, and the diameter (detected value) of the optical fiber after drawn tends to increase; therefore, the real drawing speed v(t) is controlled to increase so that the diameter of the optical fiber approximates to the target diameter d. As the real drawing speed v(t) exceeds the target drawing speed v1, on the contrary, the preform feeding speed Vf is decelerated according to the formula (B); consequently, the real drawing speed v(t) is controlled to decrease so that the diameter of the optical fiber approximates to the target diameter d.

The optical fiber drawing device according to the patent document 1 has a mechanism that drives to rotate a preform feeding motor, so that the speed of feeding the optical fiber preform into the drawing furnace approximates to the preform feeding speed Vf(t) acquired by the above calculation, to thereby produce a good quality optical fiber.

Now, the preform diameter D, target diameter d, and target drawing speed v1 in the steady state operation are preset as the operational conditions of the optical fiber drawing device, and in the optical fiber drawing device according to the patent document 1, as long as the setting of the operational conditions is not modified, the base preform feeding speed Vf1 calculated by the formula (A) is constant.

In contrast, in the unsteady state operation such as a start-up state or terminating state of the optical fiber drawing device, it becomes necessary to adjust the above preform feeding speed by varying it significantly. Accordingly in the unsteady state operation, to rely only on the technique that makes the base preform feeding speed Vf1 constant by the above formula (B) will necessarily correct the preform feeding speed requiring a large adjusting range only by the above correction terms $\Delta Vf1$, $\Delta Vf2$, which leads to increasing weight in the arithmetic operation of these correction terms.

However, the correction $\Delta Vf1$ is a correction term based on a discrepancy of the real drawing speed against the target drawing speed v1; and the correction $\Delta Vf2$ is the one related with the dynamic correction, namely, correction of over or short of the correction tendency Therefore, when a required adjusting range is significant, the weight to this correction term becomes huge, which leads to increasing the possibility of creating a malfunction such as hunting or overshoot.

In the optical fiber drawing device according to the patent document 1, it is easy to conceive that the values of the coefficients K1 and K2 being always optimized is the premise for acquiring a precise preform feeding speed Vf(t). However, it is extremely difficult to set the coefficients K1 and K2 as a unique value, which cover the unsteady state such as a start-up state or terminating state of the device, wherein the drawing speed varies significantly. As there occurs a malfunction such as hunting or overshoot from such a cause, the diameter and coating condition of the optical fiber are not stabilized, which causes a quality deterioration or yield lowering of the optical fiber. In addition if the hunting or overshoot generated is excessive, the drawing speed m the optical fiber drawing device will fall into an impossibility of control, which will consequently lead to a breaking of the optical fiber. These problems in the unsteady (transient) state operation such as a start-up state of the optical fiber drawing device are the ones generated in the operational parameters such as the aforementioned drawing speeds and the correction terms, which determine the operational conditions of the optical fiber drawing device.

Further, accompanied with the tendency toward a larger diameter in the optical fiber preform, the start-up fiber length (or speed increasing time) increases, and the lowering of the yield becomes a problem. However, in case of increasing the acceleration in pursuit of shortening the start-up fiber length (or speed increasing time), it will intensify the possibility that causes a malfunction such as hunting or overshoot in the start-up tail end (near the target drawing speed.

Therefore, the present invention has been made in view of the above circumstances, and an object of the present invention is to provide an optical fiber drawing device capable of a stable drawing control that does not generate hunting or overshoot or the like, while reducing the start-up fiber length (or speed increasing time) in the unsteady state (transient state) operation of the optical fiber drawing device.

Patent Document 1: Japanese Patent Lad-Open No. Hei10 (1998)-81538

DISCLOSURE OF THE INVENTION

In order to achieve the above object, the present invention provides an optical fiber drawing device that produces an optical fiber from a preform which includes: a drawing furnace that heats, melts, and draws the preform; a preform feeding unit that holds the preform and feeds the preform into the drawing furnace; a cooling unit that cools a bare optical fiber drawn by the drawing furnace; a coating unit that applies a coating resin to the bare optical fiber; a capstan that takes up a coated bare optical fiber; a winding unit that winds up an optical fiber strand taken up by the capstan; a real drawing speed detection unit that detects a real drawing speed of the optical fiber strand being taken up; an arithmetic and control unit that generates a speed command signal of a preform feeding speed on the basis of a signal of the real drawing speed detected by the real drawing speed detection unit; and a preform feeding speed adjusting unit that adjusts a preform feeding speed by the preform feeding unit, on the basis of the speed command signal.

Here, the arithmetic and control unit adopts, as the speed command signal, the preform feeding speed set in response to a base preform feeding speed and a feed-back correction determined on the basis of a deviation between a target variation of a drawing speed and a variation of the real drawing speed and at least one of the base preform feeding speed and the target variation of the drawing speed is set in response to the real drawing speed.

The drawing speed in the optical fiber drawing device is automatically adjusted (feedback-controlled) so that the diameter of the optical fiber after drawn becomes a target diameter however, the relation between the supply of the preform in the furnace and the elution is not stabilized in the unsteady state operation such as an start-up state operation or a terminating state operation or the like and the real drawing speed varies momentarily significantly. And in a start-up state (one example of the unsteady state), for example, if the variation of the real drawing speed (acceleration of the drawing) is too large, there occurs overshoot or hunting while the operation transfers toward the steady state operation, and if the variation of the real drawing speed is too small, the start-up fiber length (or start-up time) becomes too long.

However, according to the construction of present invention, the variation of the drawing speed in response to the real drawing speed is set as a parameter for setting the variation of a realistic drawing speed in such an unsteady state operation, and the feeding speed of the preform is adjusted by using the target variation of a continuously varying drawing speed in response to the real drawing speed (representing a transitional variation of the realistic drawing speed in the unsteady state operation), on the basis of a comparison between the target variation of the drawing speed and the variation of the real drawing speed, or the feeding speed of the preform is adjusted by using the base preform feeding speed in response to the real drawing speed; therefore, the real drawing speed is indirectly controlled to become a realistic variation.

In concrete, when the variation of the real drawing speed is larger than the target variation of the drawing speed (acceleration is larger), if the feeding speed of the preform is adjusted to decelerate, the elution of the preform is reduced and the diameter of the optical fiber after drawn tends to shrink; accordingly, the real drawing speed is controlled to decelerate so that the diameter thereof becomes a target fiber diameter. On the contrary, when the variation of the real drawing speed is smaller than the target variation of the drawing speed (acceleration is smaller), if the feeding speed of the preform is adjusted to accelerate, the elution of the preform is increased and the real drawing speed is controlled to accelerate. In consequence, the variation of the real drawing speed in the unsteady state operation varies in a realistic form, and a stable drawing control becomes possible which does not generate hunting or overshoot or the like, while reducing a start-up fiber length (or speed increasing time).

BEST MODES FOR CARRYING OUT OF THE INVENTION

Figure 1:
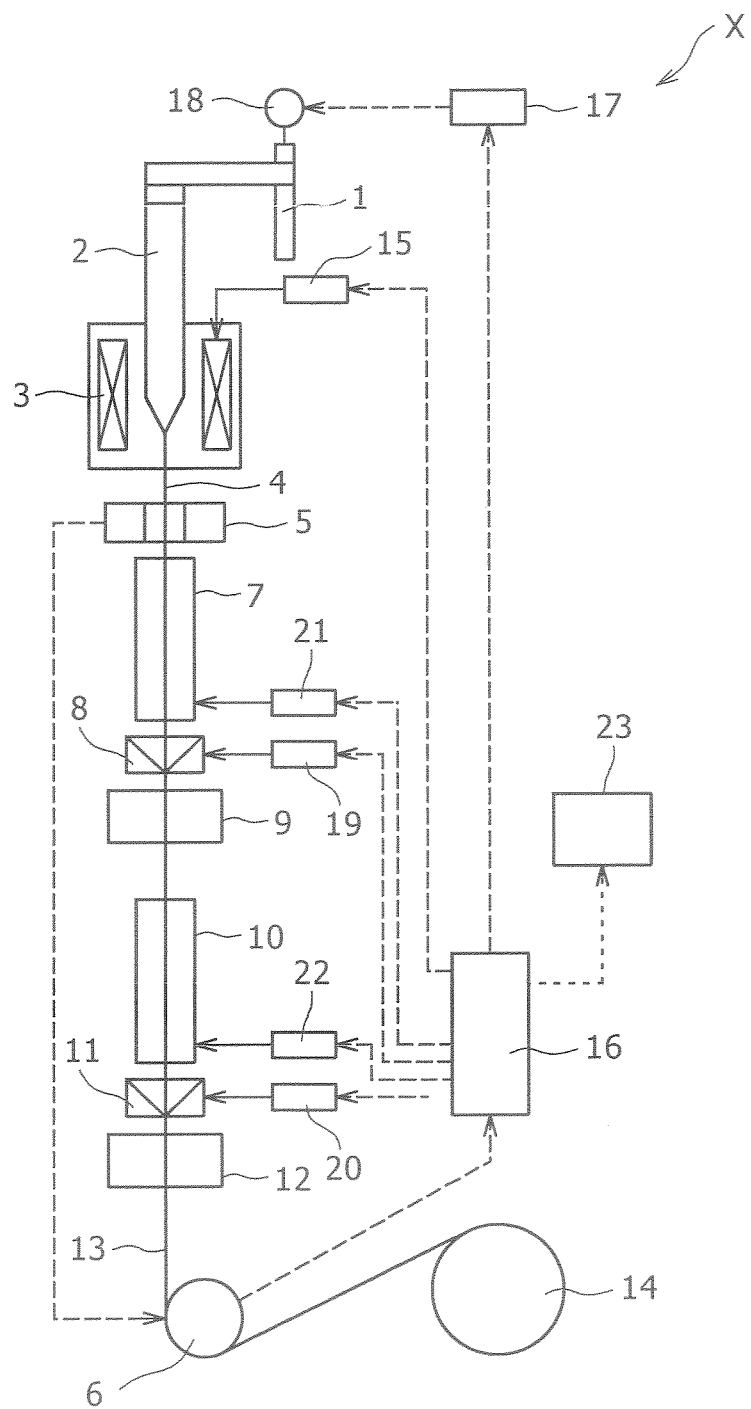
FIG. 1 is a schematic diagram of a optical fiber drawing device relating to the present embodiment.

In the optical fiber drawing device relating to the present invention, it is preferable that the arithmetic control unit determines the preform feeding speed Vf(t) by the below formula (i) and adopts it as the speed command signal.

$$Vf(t)=Vf1+KP(\Delta Vdt\_target-\Delta Vdt)+KI\int(\Delta Vdt\_target-\Delta Vdt)dt \quad (i)$$

Here,
Vf1: base preform feeding speed
ΔVdt_target: target variation of drawing speed
ΔVdt: variation of real drawing speed
KP: variation proportional gain
KI: variation Integral gain
dt: integral control cycle
However, the feedback correction in this invention is not restricted to a combination of the proportional element and the integral element, and one element may be omitted, for example, or a differential element may be added in reverse.

In the optical fiber drawing device with the above construction, it is further preferable that both the base preform feeding speed and the target variation of the drawing speed are made to be set in response to the real drawing speed. And it is still further preferable that the cycle of calculating KP, KI, and KP(ΔVdt_target−ΔVdt), or the integral control cycle is made to be set in response to the real drawing speed.

The optical fiber drawing device relating to the present invention may further include a furnace temperature adjusting device that controls a temperature of the drawing furnace in response to the real drawing speed, a coating resin pressure adjusting device that controls a pressure of coating resin in the coating device in response to the real drawing speed, and a cooling gaseous helium flow adjusting device that controls a cooling gaseous helium flow in the cooling device in response to the real drawing speed.

The optical fiber drawing device relating to the present invention may further include a stepwise storage means that stores the above various parameters set in response to the real drawing speed, stepwise in response to the real drawing speed; and it becomes possible to extract values stored in the stepwise storage means in response to the real drawing speed and apply them. Accordingly, the values to be applied may be acquired by an interpolation calculation based on the values extracted from the stepwise storage means.

The embodiment of the present invention will hereafter be described with reference to the appended drawings for a general understanding of the invention. The embodiment and the examples hereunder are one example that embodies the invention, which is not the one that will limit the technical range of the invention.

First, the construction of an optical fiber drawing device X relating to the invention will be described with FIG. 1.

The optical fiber drawing device X mainly includes a preform feeding unit 1 that holds an optical fiber preform 2, a drawing furnace 3 that heats and draws the optical fiber preform 2, a diameter measuring unit 5 that measures the diameter of a drawn optical fiber 4 (hereunder, called bare optical fiber 4), a primary cooling unit 7 that cools the bare optical fiber 4, a primary coating unit 8 and a secondary coating unit 11 that apply a coating resin to an optical fiber, a primary resin curing unit 9 and a secondary resin curing unit 12 that cure the coating resin applied, a secondary cooling unit 10 that cools the coating resin applied, a capstan 6 that takes up a bare fiber with the resin double coated (hereunder, called optical fiber strand 13), a winding unit 14 that winds up the optical fiber strand 13 taken up by the capstan 6.

Various controls and operations in the optical fiber drawing device X are performed or the basis of a predetermined program (control program in present invention) stored in an arithmetic unit 16, and each of the units are controlled by the control program. In concrete, the control program performed by the arithmetic unit 16 controls a driver 17 that controls a motor 18 to drive and rotate the preform feeding unit 1, a furnace temperature adjusting unit 15 that adjusts a temperature of the drawing furnace 3, a primary coating resin pressure adjusting unit 19 that adjusts a pressure of the coating resin in the primary coating unit 8, a secondary coating resin pressure adjusting unit 20 that adjusts a pressure of the coating resin in the secondary coating unit 11, a primary cooling gaseous helium flow adjusting unit 21 that adjusts a flow of the gaseous helium in the primary cooling unit 7, and a secondary cooling gaseous helium flow adjusting unit 22 that adjusts a flow of the gaseous helium in the secondary cooling unit 10, etc.

The production process of the optical fiber strand 13 in the optical fiber drawing device X will be described in brief.

The optical fiber preform 2 held by the preform feeding unit 1 is heated and drawn by the drawing furnace 3 to be formed into the bare optical fiber 4. Here, the preform feeding speed of feeding the optical fiber preform 2 into the drawing furnace 3 from the preform feeding unit 1 is adjusted by the motor 18 being driven to rotate according to the speed command signal transmitted from the driver 17 (the speed command signal is a data signal concerning the preform feeding speed that the arithmetic unit 16 calculates from the base preform feeding speed and the target variation of the drawing speed, described later).

The optical fiber drawing device X as one embodiment of the present invention has a mechanism that determines the outside diameter of the bare optical fiber 4 produced from the optical fiber preform 2, according to the low of mass conservation by the take-up speed of the capstan 6. Thereby, first, the diameter of the bare optical fiber 4 is measured on line by the diameter measuring unit 5, and based on the measurement result, the take-up speed of the capstan 6 is adjusted, which makes it possible to make the diameter of the bare optical fiber 4 constant.

The bare optical fiber 4 thus produced is once cooled by the primary cooling unit 7, and then the coating resin is applied to the surface thereof by the primary coating unit 8. The coating resin applied here is cured by the primary resin curing unit 9. Thereafter the bare optical fiber 4 having the coating resin coated passes the same process as above, that is, the secondary cooling unit 10, secondary coating unit 11, and secondary resin curing unit 12. The bare optical fiber 4 is double coated on the surface thereof by the coating resin to be formed into the optical fiber strand 13. The optical fiber strand 13, after passing the capstan 6, is wound up on a bobbin by the winding unit 14.

In the present invention, the operational parameters related with the operational conditions of the optical fiber drawing device X (such as the base preform feeding speed, target variation of the drawing speed, gain multiplied by the speed element related with the variation of the real drawing speed, operation cycle, drawing furnace temperature, coating resin pressure, and flow of cooling gaseous helium, etc.) are stored stepwise in correspondence with the real drawing speed set stepwise, in a predetermined storage unit that the optical fiber drawing device X provides (hereunder, called operational parameter storage unit 23). And the arithmetic unit 16 continuously measures the rotation speed of the capstan 6, and extracts the operational parameters corresponding to the real drawing speed calculated by this rotation speed, from the operational parameter storage unit 23, which are applied to the relevant units. Here, the operational parameter storage unit 23 is one example of the operational parameter storage means in the present invention.

During operation of the optical fiber drawing device X, the arithmetic unit 16 performs the predetermined operations to determine the preform feeding speed and so forth, by applying the operational parameters extracted in response to the real drawing speed that varies momentarily to the below formula. And the above driver 17 is controlled according to the calculated result.

$$Vf(t) = Vf1 + KP(\Delta Vdt\_target \cdot \Delta Vdt) + KI\!\int (\Delta Vdt\_target \cdot \Delta Vdt) dt \qquad (1)$$

Next, the preform feeding speed calculated by the base preform feeding speed and the target variation of the drawing speed will be described with Table 1 and FIG. 2 through FIG. 4. Here, the 'drawing speed' in the drawings means the real drawing speed.

Table 1 shows, correspondence with the stepwise variation of the drawing speed, the stepwise variations of the base preform feeding speed Vf1 and the target variation $\Delta Vdt\_target$ of the drawing speed, being the operational conditions, namely, the operational parameters applied to starting up the optical fiber drawing device X relating to this embodiment. In the data table of Table 1, the target drawing speed is also shown, which can be a replacement for the base preform feeding speed Vf1. It is possible to calculate stepwise and set the base preform feeding speed Vf1 by the target drawing speed and the separately set preform diameter and bare optical fiber diameter. It is only needed that either of the base preform feeding speed Vf1 and the target drawing speed is set to a practically used data table.

Figure 2:
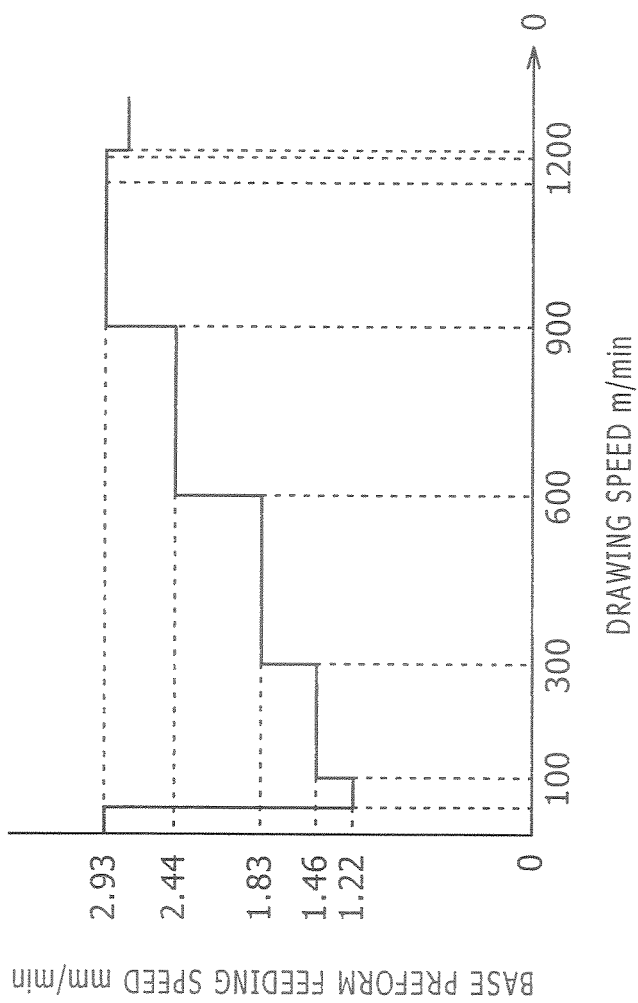
FIG. 2 is a graph illustrating a relation between the real drawing speed and the base preform feeding speed in the optical fiber drawing device relating to the embodiment.
Figure 3:
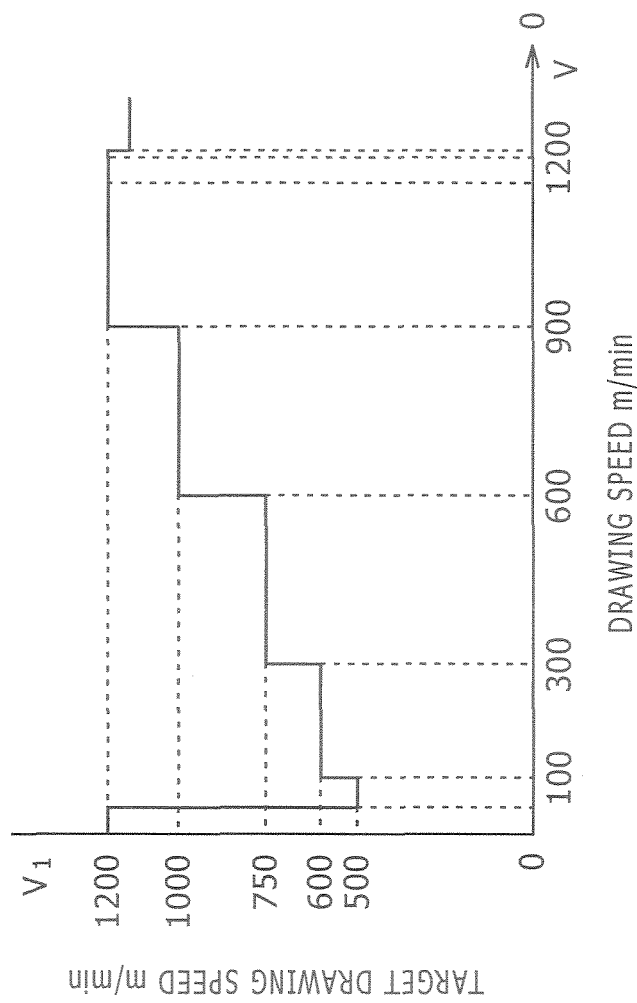
FIG. 3 is a graph illustrating a relation between the real drawing speed and the target drawing speed (replacement of the base preform feeding speed) in the optical fiber drawing device relating to the embodiment.
Figure 4:
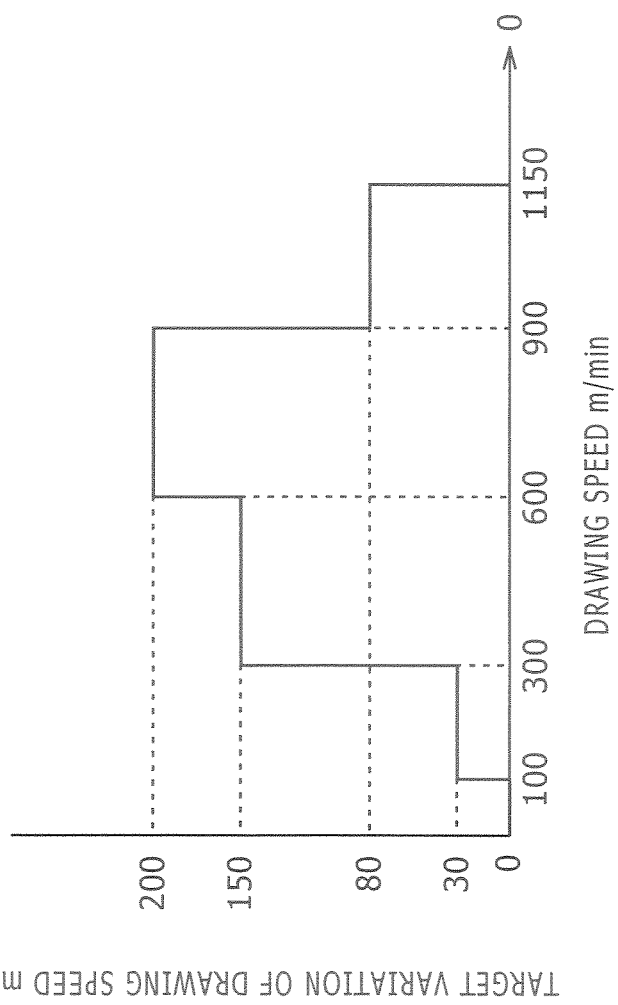
FIG. 4 is a graph illustrating a relation between the drawing speed and the target variation of the drawing speed in the optical fiber drawing device relating to the embodiment (calculated stepwise)

FIG. 2 through FIG. 4 illustrates these relations in graphs. The operational parameter storage unit 23 stores the data of the stepwise variations of the real drawing speed shown in Table 1, and the stepwise varying data of the operational parameters corresponding to the above stepwise variations.

These variations are divided into nine steps in this embodiment; however the number of the steps is appropriate. To increase the number of the steps still enable a smooth control. Here in this embodiment, the division of the accrual drawing speed, base preform feeding speed, and target variation of the drawing speed may be fixed values being inputted by a user with an operating unit or the like that allows input operations, or variable values being calculated based on predetermined information by the arithmetic unit 16.

TABLE 1

| | Drawing speed m/min | | | | | | | | | |
|---|---|---|---|---|---|---|---|---|---|---|
| | 0 | 50 | 100 | 300 | 600 | 900 | 1150 | 1195 | 1205 | 1500 |
| Base preform feeding speed mm/min | | 2.93 | 1.22 | 1.46 | 1.83 | 2.44 | 2.93 | 2.93 | 2.93 | 2.81 |
| Base preform feeding speed (target drawing speed) m/min | 1200 | 500 | 600 | 750 | 1000 | 1200 | 1200 | 1200 | 1150 | |
| Set drawing speed variation m/min$^2$ | | 0 | 0 | 30 | 150 | 200 | 80 | 0 | 0 | 0 |
| Variation proportional gain % | | 0.0 | 0.0 | 5.0 | 8.0 | 10.0 | 5.0 | 0.0 | 0.0 | 0.0 |
| Variation integral gain % | | 0.0 | 0.0 | 2.0 | 4.0 | 5.0 | 2.0 | 0.0 | 0.0 | 0.0 |
| Proportional operation cycle sec | | 10.0 | 10.0 | 10.0 | 5.0 | 2.0 | 2.0 | 2.0 | 2.0 | 2.0 |
| Integral operation cycle sec | | 20.0 | 20.0 | 20.0 | 10.0 | 5.0 | 5.0 | 5.0 | 5.0 | 5.0 |

The arithmetic unit 16 reads out the base preform feeding speed and the target variation of the drawing speed corresponding to the real drawing speed calculated by the rotation frequency of the capstan 6, from the operational parameter storage unit 23 in connection with the real drawing speed; and the read out parameters are applied to the formula (1) thereby the preform feeding speed is set. According to Table 1, in case of the real drawing speed (t) being 500 m/min at a certain instant, for example, the base preform feeding speed and the target variation of the drawing speed are as follows.

base preform feeding speed: 1.83 mm/min
target variation of the drawing speed: 150 m/min$^2$ And according to Table 1, in case of the real drawing speed being 500 m/min at a certain instant, for example, the target drawing speed and the target variation of the drawing speed are as follows.

target drawing speed: 750 m/min
target variation of the drawing speed: 150 m/min$^2$ And in case of the separately set preform diameter being 80 mm, and the diameter of the bare optical fiber being 0.125 mm, the base preform feeding speed Vf1 becomes:

$$Vf1=((0.125)^2/(80)^2)\times 750=1.83 \text{ mm/min}$$

As these data are substituted into the formula (1), the arithmetic unit 16 calculates the preform feeding speed, using the base preform feeding speed and the target variation of the drawing speed. And the driver 17 drives to rotate the motor 18 according to the preform feeding speed thus calculated; thereby, the supply of the optical fiber preform 2 from the preform feeding unit 1 into the drawing furnace 3 is controlled.

Next, the arithmetic operation of the preform feeding speed that the arithmetic unit 16 performs will be described.

Provided that the real drawing speed at a time t during drawing in the optical fiber drawing device X is given by V(t), and the drawing speed before dt from the time t is given by V(t−dt), the variation of the real drawing speed per the time dt, that is, the acceleration ΔVdt is calculated as follows.

$$\Delta Vdt=V(t)-V(t-dt) \quad (2)$$

According to Table 1, in case of the current drawing speed being 600 mm/min, the drawing speed before 10 sec being 580 mm/min, for example, the acceleration ΔVdt becomes as follows.

$$\Delta Vdt=(600-580)\times 60/10=120 \text{ mm/min}^2$$

Now, in case the arithmetic unit 16 performs the above control with a PLC (programmable Logic Controller), the control becomes as follows.

After the real drawing speed is acquired by the cycle of about 100 msec, the moving average of about 10 to 100 accumulated data of the latest drawing speed is performed. The result of this moving average is adopted as the current real drawing speed. Next, the drawing speed before the time dt, of which data are moving-averaged, is subtracted from the above current real drawing speed; thereby, the variation ΔVdt of the real drawing speed at the constant time dt can be calculated. Here, it is conceivable to calculate the variation of the real drawing speed by the cycle of about 100 msec, to moving-average about 10 to 100 variation data of the latest real drawing speed, and to adopt the result as the variation ΔVdt of the current real drawing speed.

As stated in the above formula (1), by adding the arithmetic operation results of the proportional operation and the integral operation, which are performed to the difference between the target variation of the drawing speed and the real variation thereof, to the base preform feeding speed, the preform feeding speed is calculated.

In the formula (1) according to the present invention, the gain KP (hereunder, called variation proportional gain) multiplied by the difference between the target variation of the drawing speed and the real variation thereof, the gain KI (hereunder, called variation integral gain) multiplied by the integral value of the difference between the target variation of the drawing speed and the real variation thereof, and the proportional operation cycle and integral operation cycle as the cycle of operating each are stored stepwise in the operational parameter storage unit 23. And the arithmetic unit 16 extracts these stepwise operational parameters from the operational parameter storage unit 23 in response to the variation of the real drawing speed, and applies the extracted parameters to the formula (1), and uses them for the arithmetic operation of the preform feeding speed Vf(t).

Figure 5:
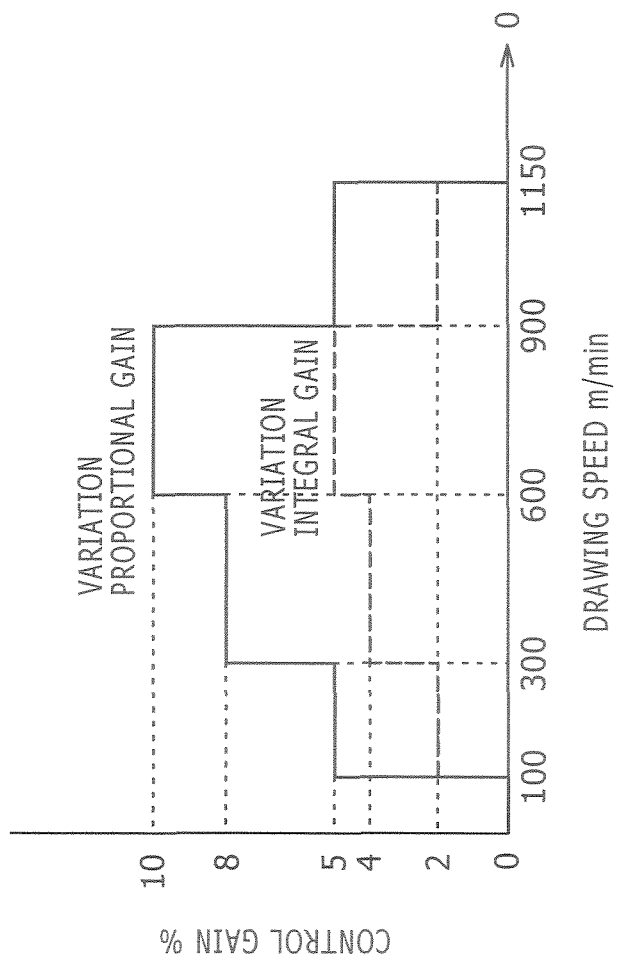
FIG. 5 is a graph illustrating a relation between the drawing speed and the control gain in the optical fiber drawing device relating to the embodiment (calculated stepwise)
Figure 6:
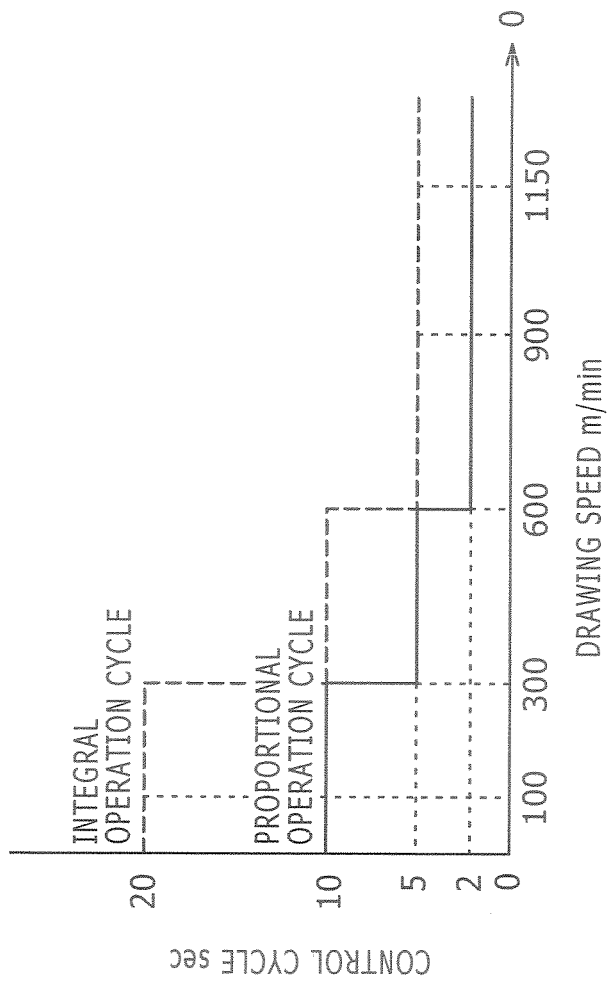
FIG. 6 is a graph illustrating a relation between the drawing speed and the control cycle in the optical fiber drawing device relating to the embodiment (calculated stepwise)

The arithmetic operation of the preform feeding speed by using the variation proportional gain KP, variation integral gain KI, proportional operation cycle, and integral operation cycle will be described with Table 1, FIG. 5, and FIG. 6.

Table 1 also shows the stepwise set data of the variation proportional gain KP, variation integral gain KI, proportional operation cycle, and integral operation cycle, being the operational parameters in the operational conditions of the optical fiber drawing device X relating to this embodiment. These data are used in the automatic start-up. FIG. 5 and FIG. 6 illustrate these relations in graphs. The operational parameter storage unit 23 stores the data of the stepwise variations of the real drawing speed shown in Table 1, and the stepwise varying data of the operational parameters corresponding to the above stepwise variations.

These variations are divided into nine steps in this embodiment; however the number of the steps is appropriate, the same as the above. Here in this embodiment, the division of the accrual drawing speed, variation proportional gain KP variation integral gain KI, proportional operation cycle, and integral operation cycle may be fixed values being inputted by a user with an operating unit or the like that allows input operations, or variable values being calculated based on predetermined information by the arithmetic unit 16.

The arithmetic unit 16 reads out the variation proportional gain KP, variation integral gain KI, proportional operation cycle, and integral operation cycle, corresponding to the real drawing speed calculated by the rotation frequency of the capstan 6, from the operational parameter storage unit 23 in connection with the momentarily varying real drawing speed; and the read out parameters are applied to the formula (2), thereby the preform feeding speed Vf(t) is set. According to Table 1, in case of the real drawing speed V(t) being 500 m/min at a certain instant, for example, the variation proportional gain KP, variation integral gain KI, proportional operation cycle, and integral operation cycle are as follows.

variation proportional gain A: 8.0%
variation integral gain KI: 4.0%
proportional operation cycle: 5.0 sec
integral operation cycle: 10.0 sec As these data are substituted into the formula (1), the preform feeding speed Vf(t) is set. Here, the proportional term KP(ΔVdt_target−ΔVdt) and the integral term KI∫(ΔVdt_target−ΔVdt)dt are calculated each independently by the above proportional operation cycle (5.0 sec) and the integral operation cycle (10.0 sec). Thereby, the operation becomes possible which sufficiently utilizes the response characteristics corresponding to the time of the proportional operation and integral operation.

As shown in FIG. 3, FIG. 4, FIG. 5 and FIG. 6, with regard to the operational parameters: the base preform feeding speed Vf1, target drawing speed v1, variation proportional gain KP, variation integral gain KI, proportional operation cycle, and integral operation cycle, the arithmetic unit 16 determines one out of the nine divisions set in the data table that the real drawing speed calculated by the measured value of the rotation speed of the capstan 6 corresponds to, reads out the operational parameters corresponding to the division concerned from the data table, and uses the parameters read out as they are. Accordingly, the operational parameters will vary stepwise in response to the variation of the real drawing speed.

Figure 7:
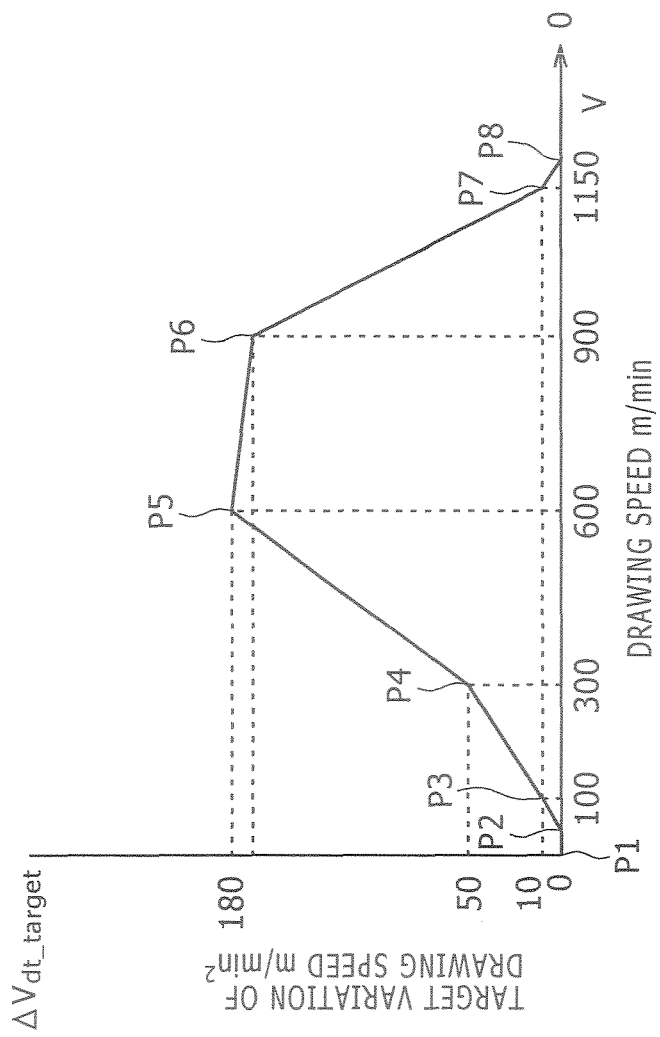
FIG. 7 is a graph illustrating a relation between the drawing speed and the target variation of the drawing speed in the optical fiber drawing device relating to the embodiment (calculated by the linear interpolation)

On the other hand the arithmetic unit 16 (one example of a drawing speed target variation deriving means) reads out a variation set value ΔVdt_S of the drawing speed set stepwise in response to the variation of the drawing speed (variation set value of the drawing speed corresponding to each of plural thresholds specifying plural divisions of the drawing speed) from the operational parameter storage unit 23, performs a linear interpolation calculation with the data read out, and acquires the target variation ΔVdt_target of the drawing speed that continuously varies in response to the variation of the real drawing speed, as shown in FIG. 7. The arithmetic unit 16 acquires the target variation ΔVdt_target of the drawing speed in order to apply it to the formula (1).

Making a graph by taking the target variation ΔVdt_target of the drawing speed acquired by the linear interpolation calculation on the vertical axis and the real drawing speed on the horizontal axis will form a virtually gable-like shape, as shown in FIG. 7. Here, each of the break points P1 through P8 on the graph in FIG. 7 is the point representing the variation set value ΔVdt_S of the drawing speed.

And in case of the separately set preform diameter D being 80 mm, and the target diameter d of the bare optical fiber being 0.125 mm, the base preform feeding speed Vf1 is calculated by the formula (A), as follows.

$$Vf1=((0.125)^2/(80)^2)\times 750=1.83 \text{ mm/min}$$

Next, a concrete example of the arithmetic operation of the preform feeding speed Vf executed by the arithmetic unit 16 will be described.

Provided that the real drawing speed at a time t during drawing in the optical fiber drawing device X is given by v(t), and the drawing speed before dt from the time t is given by v(t−dt) the variation of the real drawing speed per the time dt, that is, the acceleration ΔVdt is calculated as follows.

$$\Delta Vdt = v(t)-v(t-dt)$$

According to Table 2, in case of the current drawing speed being 600 mm/min, the drawing speed (dt) 10 sec before being 580 mm/min, for example, the acceleration Δdt becomes as follows.

$$\Delta Vdt=(600-580)-60/10=120 \text{ mm/min}^2$$

Now, in case the arithmetic unit 16 composed of a PLC (programmable Logic Controller) executes the arithmetic

TABLE 2

|  | Drawing speed m/min | | | | | | | | | |
|---|---|---|---|---|---|---|---|---|---|---|
|  | 0 | 50 | 100 | 300 | 600 | 900 | 1150 | 1195 | 1205 | 1500 |
| Set drawing speed variation m/min² | 0 | 0 | 10 | 50 | 180 | 170 | 10 | 0 | 0 | 0 |
| Variation proportional gain % | 0.0 | 0.0 | 0.0 | 6.0 | 10.0 | 8.0 | 5.0 | 0.0 | 0.0 | 0.0 |
| Variation integral gain % | 0.0 | 0.0 | 0.0 | 3.0 | 5.0 | 4.0 | 2.0 | 0.0 | 0.0 | 0.0 |
| Proportional operation cycle sec | 10.0 | 10.0 | 10.0 | 8.0 | 4.0 | 2.0 | 2.0 | 2.0 | 2.0 | 2.0 |
| Integral operation cycle sec | 20.0 | 20.0 | 20.0 | 16.0 | 8.0 | 5.0 | 5.0 | 5.0 | 5.0 | 5.0 |

The arithmetic unit 16 applies to the above formula (1) the operational parameters acquired by applying the real drawing speed to the data table, such as the base preform feeding speed Vf1, target variation ΔVdt_target of the drawing speed, proportional gain KP and integral gain KI, proportional operation cycle and integral operation cycle, and the variation ΔVdt of the real drawing speed acquired by the measured value of the rotation speed of the capstan 6, and calculates the preform feeding speed Vf. The driver 17 is controlled according to the calculated result, and the supply of the optical fiber preform 2 from the preform feeding unit 1 into the drawing furnace 3 is controlled.

The below is one example of the interpolation calculation of the target variation ΔVdt_target of the drawing speed by the arithmetic unit 16.

According to Table 2, in case of the real drawing speed v(t) being 500 m/min at a certain instant, for example, the base preform feeding speed Vf1 and the target variation ΔVdt_target of the drawing speed are as follows.

base preform feeding speed: 183 mm/min
target variation of the drawing speed:

$$50+(180-50)\times(500-300)/(600-300)=137 \text{ m/min}^2$$

And, according to Table 2, in case of the real drawing speed being 500 m/min at a certain instant, for example, the target drawing speed v1, base preform feeding speed Vf1, and target variation ΔVdt_target of the drawing speed are as follows.

Target drawing speed: 750 m/min
Target variation of the drawing speed:

$$50+(180-50)\times(500-300)/(600-300)=137 \text{ m/min}^2$$

operation to calculate the variation (acceleration) ΔVdt of the real drawing speed, the operation becomes as follows, as an example.

The real drawing speed is acquired by the cycle of about 100 msec, and is accumulated. The moving average of about 10 to 100 accumulated data of the latest drawing speed is performed. The result of this moving average is adopted as the real drawing speed. The data for a constant time dt is always stored including the current speed (latest moving average).

Next, as to the moving-averaged real drawing speed, the drawing speed before the time dt is subtracted from the current drawing speed; thereby, the variation ΔVdt of the real drawing speed at the constant time dt can be calculated. Here it is conceivable to calculate the variation of the real drawing speed by the cycle of about 100 msec to moving-average about 10 to 100 variation data of the latest real drawing speed, and to adopt the result as the variation ΔVdt of the current real drawing speed.

Next, one example of the arithmetic operation of the preform feeding speed Vf, using the variation proportional gain KP, variation integral gain KI, proportional operation cycle, and integral operation cycle, will be described.

With regard to the variation proportional gain KP, variation integral gain KI, proportional operation cycle, and integral operation cycle, corresponding to the real drawing speed calculated by the rotation speed (measured value) of the capstan 6, the arithmetic unit 16 reads out the set values of the above data table corresponding to the momentarily varying real drawing speed, from the operational parameter storage unit 23, and applies the set values to the formula (1), and calculates the preform feeding speed Vf(t).

According to Table 2, in case of the real drawing speed V(t) being 500 m/min at a certain instant, for example, the variation proportional gain KP, variation integral gain KI, proportional operation cycle, and integral operation cycle are as follows.

variation proportional gain KP: 8.0%
variation integral gain KI: 4.0%
proportional operation cycle: 5.0 sec
integral operation cycle; 10.0 sec As these data are substituted into the formula (1) the preform feeding speed Vf(t) is calculated.

Here, in the formula (1), the proportional term KP(ΔVdt_target−ΔVdt) and the integral term KI∫(ΔVdt_target−ΔVdt)dt are calculated each independently by the above proportional operation cycle (5.0 sec) and the integral operation cycle (10.0 sec). Thereby, the operation becomes possible which sufficiently utilizes the response characteristics corresponding to the time of the proportional operation and integral operation.

Further, as shown in Table 1, in the data table applied to the control of start-up operation or terminating operation, when the real drawing speed varies from one division into another, the variation proportional gain KP, variation integral gain KI, proportional operation cycle, and integral operation cycle vary sharply; and in order to suppress the sharp variations of these values, it is possible to calculate these values by the linear interpolation.

In this embodiment, the operational parameters are preset stepwise in response to the real drawing speed, and such operational parameters are applied one after another according to the variations of the real drawing speed; accordingly, the control becomes stepwise, which gives a problem of smoothness in the control. In order to solve this problem, the method of calculating intermediate operational parameters by the linear interpolation, based on the operational parameters that are stepwise preset, will be described with Table 2, FIG. 8, and FIG. 9.

Figure 8:
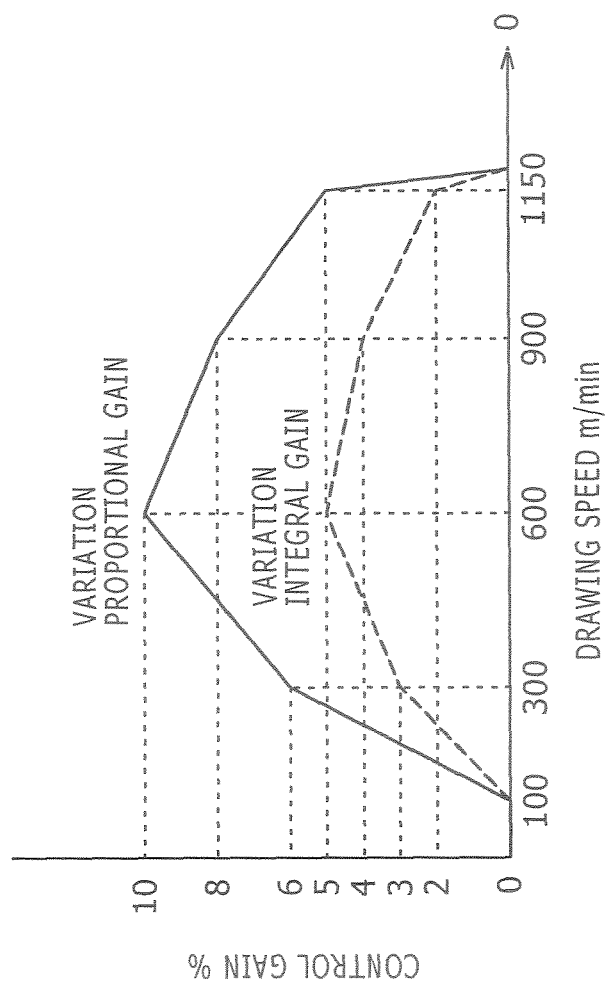
FIG. 8 is a graph illustrating a relation between the drawing speed and the control gain in the optical fiber drawing device relating to the embodiment (calculated by the linear interpolation)
Figure 9:
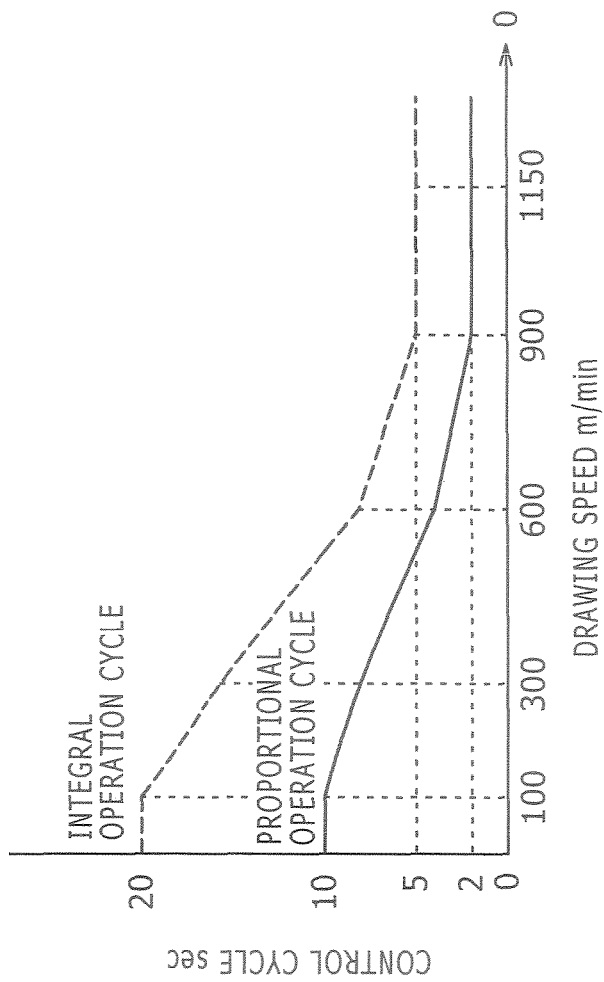
FIG. 9 is a graph illustrating a relation between the drawing speed and the control cycle in the optical fiber drawing device relating to the embodiment (calculated by the near interpolation)

Table 2 is a data table of stepwise operation parameters, which are set to apply to the linear interpolation formula the intermediate values of the variation proportional gain KP, variation integral gain KI, proportional operation cycle, and integral operation cycle relating to the operational conditions of the optical fiber drawing device X of this embodiment. FIG. 8 and FIG. 9 show these relations in graphs. And the stepwise variations of the real drawing speed as shown in Table 2, and the stepwise varying data of the operational parameters corresponding to the former are stored in the operational parameter storage unit 23.

These variations are divided into nine steps in this embodiment; however the number of the steps is appropriate. Here in this embodiment, the division of the accrual drawing speed, variation proportional gain KP, variation integral gain KI, proportional operation cycle, and integral operation cycle may be fixed values being inputted by a user with an operating unit or the like that allows input operations, or variable values being calculated based on predetermined information by the arithmetic unit 16.

The arithmetic unit 16 reads out the variation proportional gain variation integral gain proportional operation cycle, and integral operation cycle, corresponding to the real drawing speed calculated by the rotation frequency of the capstan 6, from the operational parameter storage unit 23 in connection with the real drawing speed; and applies the read out parameters to the below formula (3). And the arithmetic unit 16 calculates the variation proportional gain KP, variation integral gain KI, proportional operation cycle, and integral operation cycle corresponding to the real drawing speed at a certain instant by using the linear interpolation formula (3). Here, V1 and V2 are the drawing speeds (V1<V2) that determine the divisions for the drawing speed, KP1 and KP2 the variation proportional gains corresponding to the drawing speeds V1 and V2, KI1 and KI2 the variation integral gains corresponding to the drawing speeds V1 and V2, TP1 and TP2 the proportional operation cycles in response to the drawing speeds V1 and V2, TI1 and TI2 the integral operation cycles corresponding to the drawing speeds V1 and V2.

$$\text{variation proportional gain: } KP=KP1+(KP2-KP1)\cdot(V(t)-V1)/(V2-V1)$$

$$\text{variation integral gain: } KI=KI1+(KI2-KI1)\cdot(V(t)-V1)/(V2-V1)$$

$$\text{proportional operation cycle: } TP=TP1+(TP2-TP1)\cdot(V(t)-V1)/(V2-V1)$$

$$\text{integral operation cycle: } TI=TI1+(TI2-TI1)\cdot(V(t)-V1)/(T2-V1) \quad (3)$$

Now, according to Table 2, in case of the real drawing speed at a certain instant being 500 m/min, for example, the parameters are set from the data in FIG. 5, as follows: V1=300 m/min, V2=600 m/min, KP1=6.0, KP2=10.0, KI1=3.0, KI2=5.0, TP1=8.0, TP2=4.0, TI1=16.0, TI2=8.0. And, the variation proportional gain KP, variation integral gain KI, proportional operation cycle, and integral operation cycle are calculated according to these set values on the basis of the linear interpolation formula (3).

$$\text{variation proportional gain: } KP=6.0+(10.0-6.0)\cdot(500-300)/(600-300)=8.7\%$$

$$\text{variation integral gain: } KI=3.0+(5.0-3.0)\cdot(500-300)/(600-300)=4.3\%$$

$$\text{proportional operation cycle: } TP=8.0+(4.0-8.0)\cdot(500-300)/(600-300)=5.3 \text{ sec}$$

$$\text{integral operation cycle: } TI=16.0+(8.0-16.0)\cdot(500-300)/(600-300)=10.7 \text{ sec}$$

The variation proportional gain KP, variation integral gain KI, proportional operation cycle, and integral operation cycle are calculated by the linear interpolation, thereby it is possible to suppress the stepwise and sharp variations of the above values when the real drawing speed varies from one division into another; accordingly, a smooth and stable control becomes possible.

Figure 10:
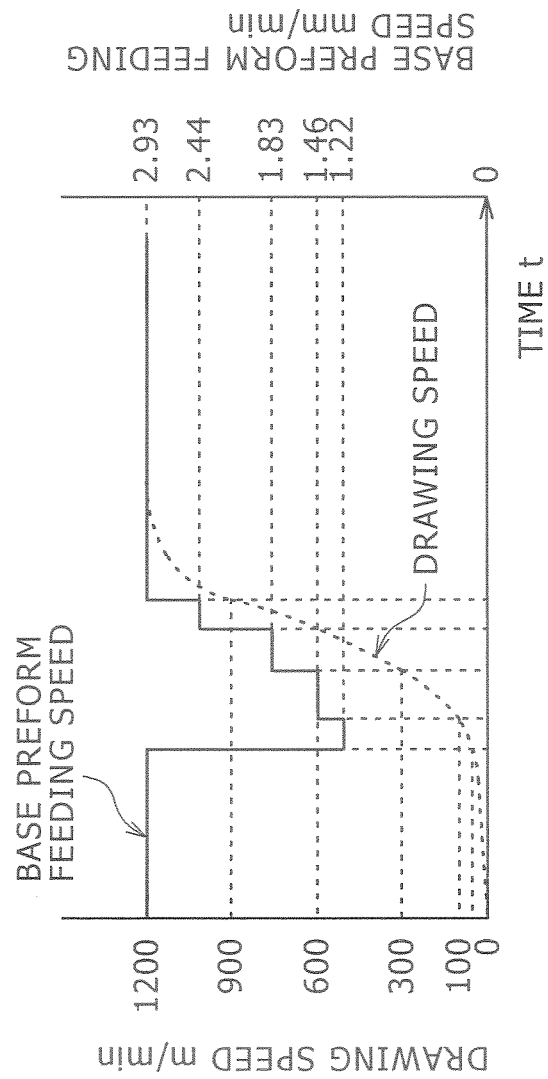
FIG. 10 is a graph illustrating a relation between the drawing speed and the base preform feeding speed accompanied with the elapsed time, in the optical fiber drawing device relating to the embodiment.
Figure 11:
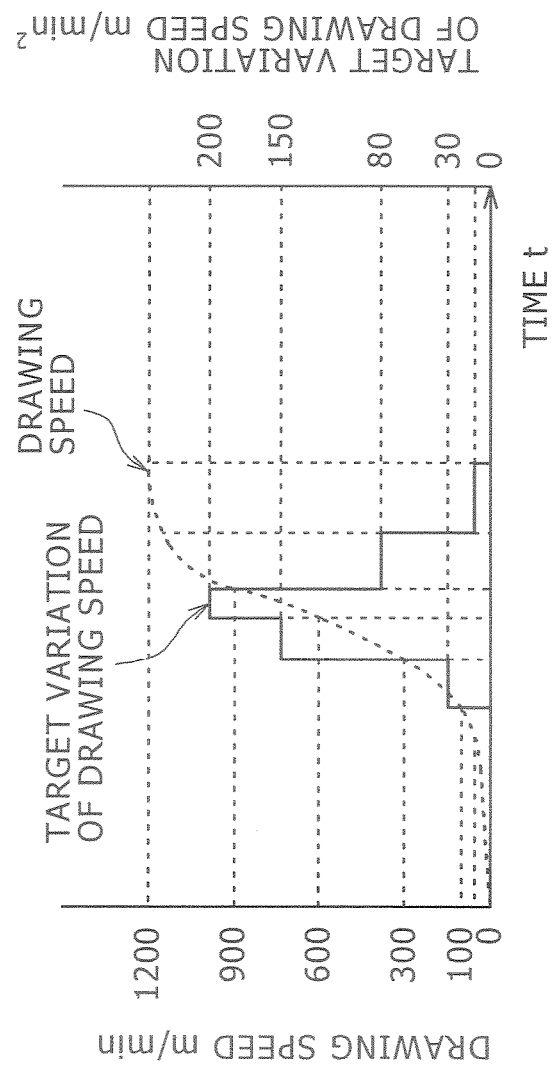
FIG. 11 is a graph illustrating a relation between the drawing speed and the target variation of the drawing speed accompanied with the elapsed time, in the optical fiber drawing device relating to the embodiment (calculated stepwise)
Figure 12:
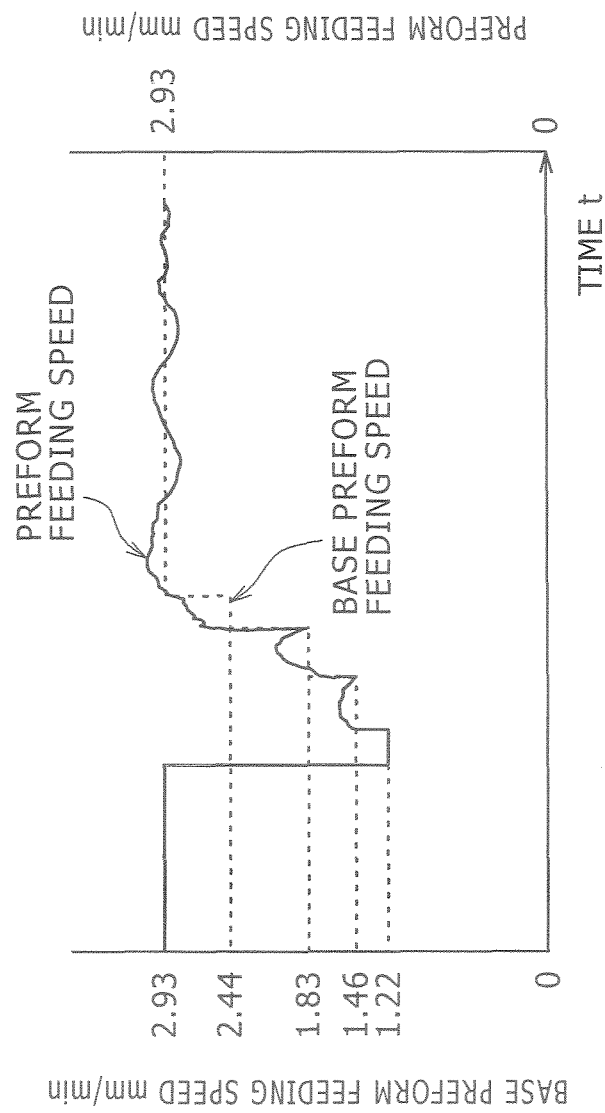
FIG. 12 is a graph illustrating a relation between the base preform feeding speed and the real preform feeding speed accompanied with the elapsed time, in the optical fiber drawing device relating to the embodiment.

Now, FIG. 10 is a graph illustrating a relation between the real drawing speed and the base preform feeding speed accompanied with the elapsed time, FIG. 11 is a graph illustrating a relation between the real drawing speed and the target variation of the drawing speed accompanied with the elapsed time, and FIG. 12 is a graph illustrating a relation between the base preform feeding speed and the real preform feeding speed accompanied with the elapsed time.

Next will be described the result of controlling the preform feeding unit 1 in the optical fiber drawing device X, according to the preform feeding speed Vf acquired by the above calculations based on the graphs illustrated in FIG. 10, FIG. 12, and FIG. 13.

Figure 13:
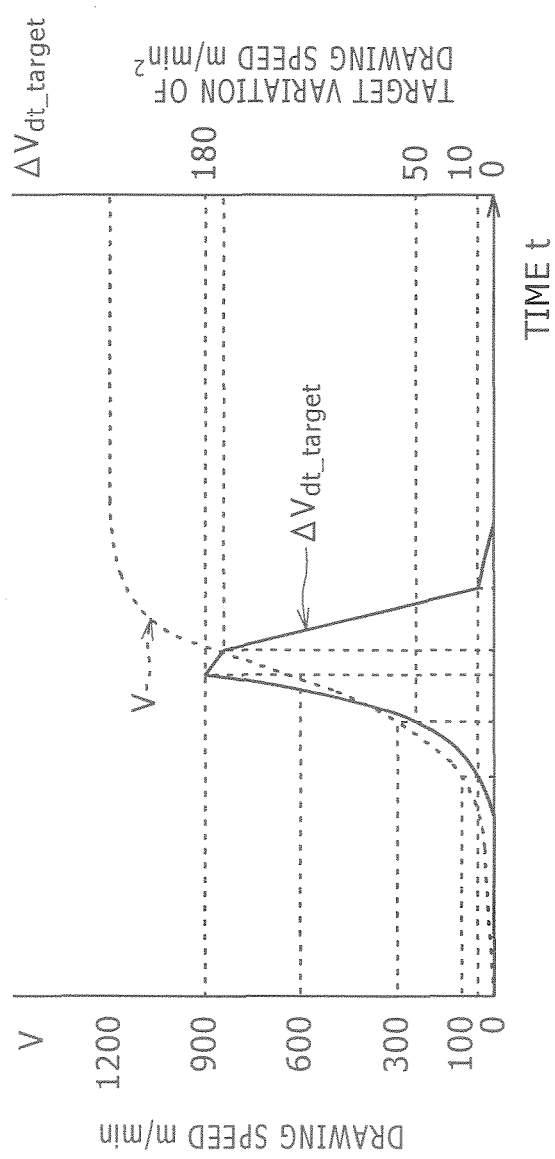
FIG. 13 is a graph illustrating a relation between the real drawing speed and the target variation of the drawing speed accompanied with the elapsed time, in the optical fiber drawing device relating to the embodiment (calculated by the linear interpolation)

Here, FIG. 13 is a graph illustrating a relation between the real drawing speed and the target variation of the drawing speed accompanied with the elapsed time (calculated by the Wear interpolation).

As shown in FIG. 10, the base preform feeding speed Vf1 is temporarily set to a high speed (2.93 mm/min, in FIG. 10) in the primary start-up stage, that is, the stage wherein the real drawing speed v is still low. Thereafter the speed Vf1 is reduced to a low speed (1.22 mm/min, in FIG. 10), and then as the real drawing speed v approximates to the target speed (1200 m/min, in FIG. 10)) in the steady state, the speed Vf1 is accelerated stepwise (in a staircase pattern) to the target speed (2.93 mm/min, in FIG. 10) in the steady state operation.

Thus, by varying the speed Vf1 itself being the base of the preform feeding speed at any time in the unsteady state operation, it becomes unnecessary to excessively increase the weight of the correction terms (relating to the gains K1, K2) in the formula (B), which leads to preventing a malfunction such as hunting or overshoot or the like.

Here, in the primary start-up stage, the base preform feeding speed Vf1 is temporarily set to a high speed. The reason is that the device starts up in the state of the optical fiber preform 2 being not yet starting to melt in the drawing furnace 3, and there is a necessity of raising the feeding speed of the optical fiber preform 2 to accelerate melting the preform 2, in the primary start-up stage.

And as shown in FIG. 13, the target variation $\Delta Vdt\_target$ of the drawing speed acquired by the linear interpolation calculation forms a gable-like graph. In the start-up state, in the interval wherein the real drawing speed v approximates to an intermediate speed (about 600 m/min, in FIG. 13) between a very low speed in the primary stage and a speed in the steady state (1200 m/min, in FIG. 13), according to increase of the real drawing speed v, the acceleration thereof is gradually increased from the state of zero (or, vicinity of zero); and in the interval wherein the real drawing speed v reaches the speed in the steady state after passing the intermediate speed, according to increase of the real drawing speed v, the acceleration thereof is gradually decreased finally to zero.

And, the preform feeding speed Vf is adjusted so that the difference between the target variation $\Delta Vdt\_target$ of the drawing speed in a gable-like shape and the variation $\Delta Vdt$ of the real drawing speed becomes zero, that is, the base preform feeding speed Vf1 is corrected according to the formula (1) to set (adjust) the preform feeding speed Vf. Thereby, the variation of the real drawing speed v (acceleration of the drawing) in transition is controlled, and the start-up curve of the real drawing speed v is controlled stably to form a realistic curve, regardless of the dispersions of the operational environments and so forth.

On the contrary, in case of setting the preform feeding speed Vf based on the formula (1), if the preform feeding speed Vf is not adjusted on the basis of the comparison of the target variation $\Delta Vdt\_target$ of the drawing speed and the variation $\Delta Vdt$ of the real drawing speed, there will be a case that the real drawing speed v in the start-up operation forms an unnecessarily sharp or unnecessarily gentle start-up curve, which does not provide a stable start-up operation.

The deviation (difference) of the real preform feeding speed Vf against the base preform feeding speed Vf1 in the graphs of FIG. 12 represents the corrections by the correction terms (terms relating to the variation proportional gain KP and variation integral gain KI) in the formula (1).

The contents thus described with FIG. 12 and FIG. 13 seem to be equivalent, in the start-up operation, to varying the base preform feeding speed Vf1 and the target variation $\Delta Vdt\_target$ of the drawing speed in response to the elapsed time after starting the operation.

However, the realistic curve of the real drawing speed V (variation of the target variation in the real drawing speed) in case of taking the elapsed time after starting the operation on the horizontal axis is apt to vary depending on the operational conditions (diameter of the perform D, diameter of the bare optical fiber d, etc.). Therefore, in case of setting the data table of the operational parameters according to the elapsed time after starting the operation, the data table corresponding to each of the operational conditions has to be prepared.

In contrast, in case of setting the data table of the operational parameters in response to the real drawing speed v, the data table thus set can be used universally, regardless of the operational conditions, which is preferable.

The aforementioned description is made as to the case that the operational parameters relating to the operation conditions of the optical fiber drawing device X are any one or two or more of the target variation of the drawing speed, base preform feeding speed, variation proportional gain, variation integral gain, proportional operation cycle, and integral operation cycle.

The present invention is also a proposal for a device capable of setting in response to the momentarily varying real drawing speed, not only the above operational parameters, but also a drawing furnace temperature being the temperature of the drawing furnace 3, a coating resin pressure being the pressure of a resin to coat the bare optical fiber 4, and a cooling gaseous helium flow being the gaseous helium flow to cool the bare optical fiber 4.

The following description is accompanied with the drawing furnace temperature, coating resin pressure, and cooling gaseous helium flow as the operational parameters. However in addition to these operational parameters (drawing furnace temperature, coating resin pressure, and cooling gaseous helium flow), it is possible to execute the stepwise application (including interpolation calculation) of the target variation of the drawing speed, variation proportional gain, variation integral gain, proportional operation cycle, and integral operation cycle, which is conceived as a problem in the above embodiment. It is also possible to execute stepwise application only to the drawing furnace temperature, coating resin pressure, and cooling gaseous helium flow, independently from the above operational parameters. Here, the latter case will be described.

Figure 14:
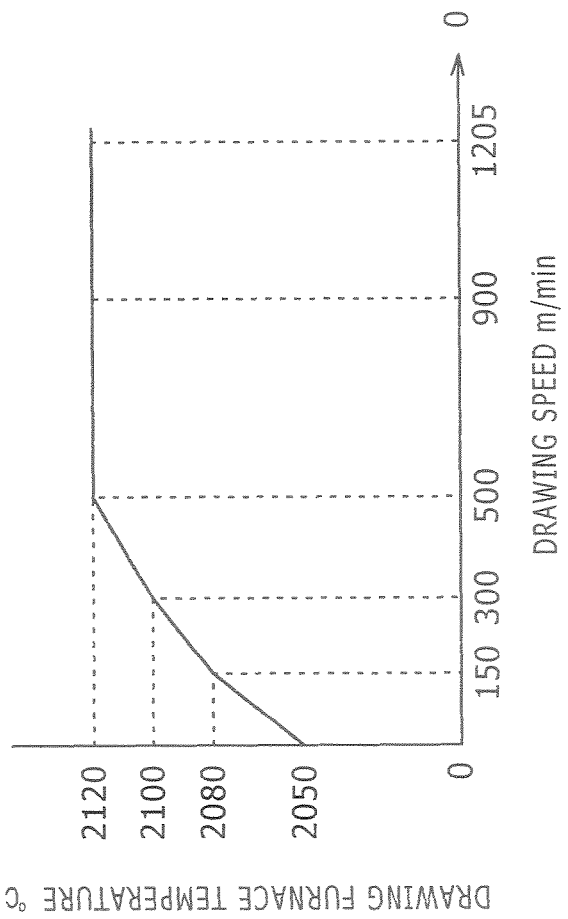
FIG. 14 is a graph illustrating a relation between the drawing speed and the drawing furnace temperature in the optical fiber drawing device relating to the embodiment.

The data table of Table 3 is applied to setting the drawing furnace temperature. The temperature variation of the drawing furnace against the drawing speed in this case is graphed in FIG. 14.

These variations are divided into nine steps also in this embodiment; however the number of the steps is appropriate. Here in this embodiment, the number of the divisions of the accrual drawing speed and the drawing furnace temperature may be fixed values being inputted by a user with an operating unit or the like that allows input operations, or variable values being calculated based on predetermined information by the arithmetic unit 16.

TABLE 3

Data Table for automatic start-up (setting the drawing furnace temperature)

| | Drawing speed m/min | | | | | | | | |
|---|---|---|---|---|---|---|---|---|---|
| | 0 | 150 | 300 | 500 | 900 | 1205 | 1210 | 1215 | 1220 | 1500 |
| Furnace temperature ° C. | 2050 | 2080 | 2100 | 2120 | 2120 | 2120 | 2120 | 2120 | 2120 | 2100 |

The temperature of the drawing furnace 3 is adjusted by the furnace temperature adjusting unit 15 that the optical fiber drawing device X provides. The furnace temperature adjusting unit 15 is controlled according to the result calculated by the arithmetic unit 16, and thereby the temperature of the drawing furnace 3 is adjusted. The arithmetic unit 16 calculates the drawing furnace temperature, substituting the drawing speed into the following linear interpolation formula (4). Here V1 and V2 are the drawing speeds (V1<V2) for determining the divisions of the drawing speed, and R1 and R2 are the drawing furnace temperatures corresponding to the drawing speeds V1 and V2.

drawing furnace temperature:

$$Rf=R1+(R2-R1)\cdot(V(t)-V1)/(V2-V1) \qquad (4)$$

According to Table 3, in case of the real drawing speed being 400 m/min at a certain instant, for example, the setting is made as V1=300 m/min, V2=500 m/min, R1=2100° C., and R2=2120° C. According to these set values, the drawing furnace temperature Rf is calculated as follows.

drawing furnace temperature:

$$Rf=2100+(2120-2100)\cdot(400-300)/(500-300)=2110°\ C.$$

Thus, the drawing furnace temperature Rf is calculated by the linear interpolation, which suppresses sharp variations occurring when the real drawing speed varies from one division to another, thereby achieving a smooth and stable control.

Figure 15:
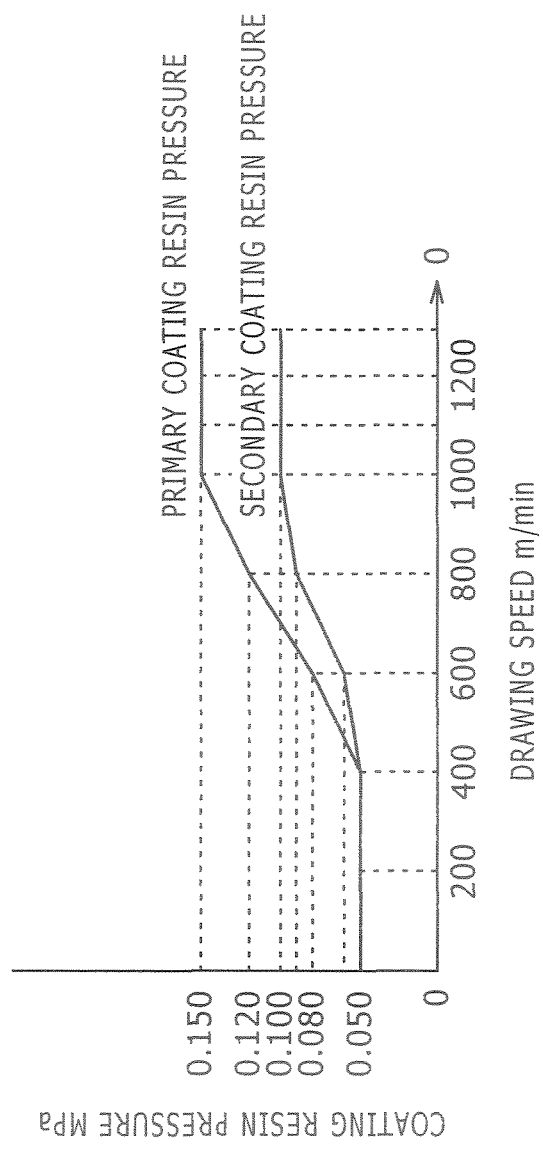
FIG. 15 is a graph illustrating a relation between the drawing speed and the coating resin pressure in the optical fiber drawing device relating to the embodiment.

The data table of Table 4 is applied to setting the coating resin pressure. Table 4 tables the data that the coating resin pressure (primary coating resin pressure, secondary coating resin pressure) is associated with the stepwise variation of the drawing speed, in the optical fiber drawing device X. And FIG. 15 graphs these relations. These values are also stored in advance in the operational parameter storage unit 23.

These variations are divided into nine steps in this embodiment, although the number of the steps is appropriate. Naturally, the number of the divisions of the accrual drawing speed and the coating resin pressure may be fixed values being inputted by a user with an operating unit or the like that allows input operations, or variable values being calculated based on predetermined information by the arithmetic unit 16.

The coating resin pressure represents the pressure of the coating resin applied to the bare optical fiber 4, in the primary coating unit 8 and the secondary coating unit 11. The coating resin pressures in the primary coating unit 8 and the secondary coating unit 11 are controlled by the primary coating resin pressure adjusting unit 19 and the secondary coating resin pressure adjusting unit 20, respectively. The arithmetic unit 16 calculates the primary coating resin pressure and the secondary coating resin pressure in response to the real drawing speed, substituting the drawing speed into the following near interpolation formula (5). Here, V1 and V2 are the drawing speeds (V1<V2) for determining the divisions of the drawing speed, P1 and P2 are the primary coating resin pressures corresponding to the drawing speeds V1 and V2, and P3 and P4 are the secondary coating resin pressures corresponding to the drawing speeds V1 and V2.

primary coating resin pressure:

$$P1st=P1+(P2-P1)\cdot(V(t)-V1)/(V2-V1)$$

secondary coating resin pressure:

$$P2nd=P3+(P4-P3)\cdot(V(t)-V1)/(V2-V1) \qquad (5)$$

As shown in Table 4, in case of the real drawing speed being 700 m/min at a certain instant, for example, from the data of Table 4, the setting is made as V1=600 m/min, V2=800 m/min, P1=0.08 MPa, P2=0.12 MPa, P3=0.06 MPa, and P4=0.09 MPa. According to these set values, the primary coating resin pressure P1st and the secondary coating resin pressure P2nd are calculated by the linear interpolation as follows.

primary coating resin pressure:

$$P1st=0.08+(0.12-0.08)\cdot(700\cdot600)/(800-600)=0.10\ \text{MPa}$$

secondary coating resin pressure:

$$P2nd=0.06+(0.09-0.06)\cdot(700-600)/(800-600)=0.075\ \text{MPa}$$

Thus, the primary coating resin pressure P1st and the secondary coating resin pressure P2nd are calculated by the linear interpolation, which suppresses sharp variations occurring when the real drawing speed varies from one division to another, thereby achieving a smooth and stable control.

Figure 16:
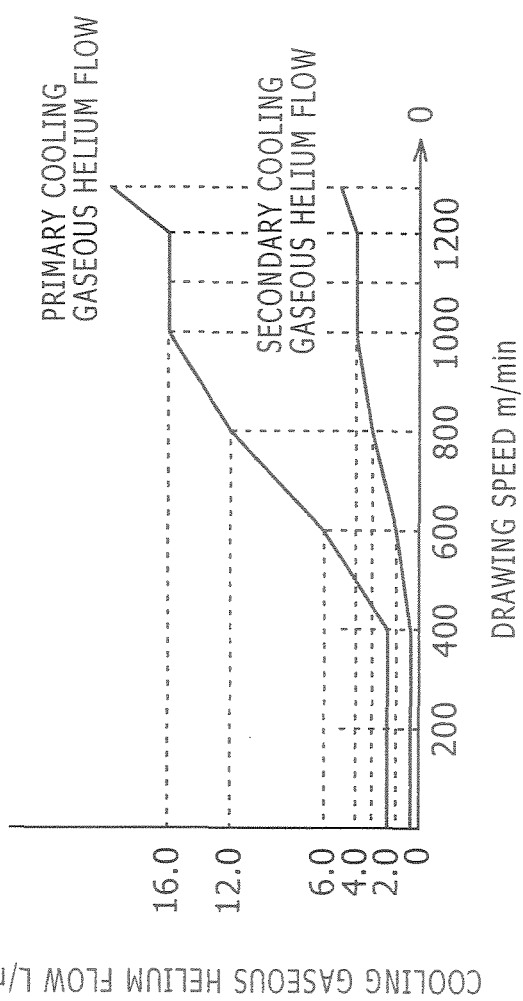
FIG. 16 is a graph illustrating a relation between the drawing speed and the flow of cooling gaseous helium in the optical fiber drawing device relating to the embodiment.

The setting of the cooling gaseous helium flow is the same as above. Table 5 shows the cooling gaseous helium flow (primary cooling gaseous helium flow, secondary cooling gaseous helium flow) preset corresponding to the stepwise variation of the drawing speed. Applying these table data to the formula (6) will acquire the interpolated cooling gaseous helium flow. And FIG. 16 graphs these relations.

primary cooling gaseous helium flow:

$$F1st=F1+(F2-F1)\cdot(V(t)-V1)/(V2-V1)$$

secondary cooling gaseous helium flow:

$$F2nd=F3+(F4-F3)\cdot(V(t)-V1)/(V2-V1) \qquad (6)$$

TABLE 4

Data Table for automatic start-up (setting the coating resin pressure)

| | Drawing speed m/min | | | | | | | | | |
|---|---|---|---|---|---|---|---|---|---|---|
| | 0 | 200 | 400 | 600 | 800 | 1000 | 1100 | 1200 | 1300 | 1500 |
| Primary coating resin pressure MPa | 0.050 | 0.050 | 0.050 | 0.080 | 0.120 | 0.150 | 0.150 | 0.150 | 0.150 | 0.150 |
| Secondary coating resin pressure MPa | 0.050 | 0.050 | 0.050 | 0.060 | 0.090 | 0.100 | 0.100 | 0.100 | 0.100 | 0.100 |

The cooling gaseous helium flow represents the quantity of the gaseous helium supplied into the coo g tubes that the primary cooling unit 7 and the secondary cooling unit 10 each provide. The cooling gaseous helium flows in the primary cooling unit 7 and the secondary cooling unit 10 are controlled by the primary cooling gaseous helium flow adjusting unit 21 and the secondary cooling gaseous helium flow adjusting unit 22, respectively. According to Table 5, in case of the real drawing speed being 700 m/min at a certain instant, for example, from the data of Table 5, the setting is made as V1=600 m/min, V2=800 m/min, F1=6.00 L/min, F2=12.00 L/min, F3=1.50 L/min, and F4=3.00 L/min. According to these set values, the primary cooling gaseous helium flow F1st and the secondary cooling gaseous helium flow F2nd are calculated by the linear interpolation as follows.

primary cooling gaseous helium flow:

$$F1st=6.00+(12.00-6.00)\cdot(700-600)/(800-600)=9.00 \text{ L/min}$$

secondary cooling gaseous helium flow:

$$F2nd=1.50+(3.00-1.50)\cdot(700-600)/(800-600)=2.25 \text{ L/min}$$

Thus, the primary cooling gaseous helium flow F1st and the secondary cooling gaseous helium flow F2nd are calculated by the linear interpolation, which suppresses sharp variations occurring when the real drawing speed varies from one division to another, thereby achieving a smooth and stable control.

TABLE 5

Data Table for automatic start-up (setting the cooling gaseous helium flow)

| | drawing speed m/min | | | | | | | | |
|---|---|---|---|---|---|---|---|---|---|
| | 0 | 200 | 400 | 600 | 800 | 1000 | 1100 | 1200 | 1300 | 1500 |
| primary cooling gaseous helium flow L/min | 2.00 | 2.00 | 2.00 | 6.00 | 12.00 | 16.00 | 16.00 | 16.00 | 20.00 | 20.00 |
| secondary cooling gaseous helium flow L/min | 0.50 | 0.50 | 0.50 | 1.50 | 3.00 | 4.00 | 4.00 | 4.00 | 5.00 | 5.00 |

Figure 17:
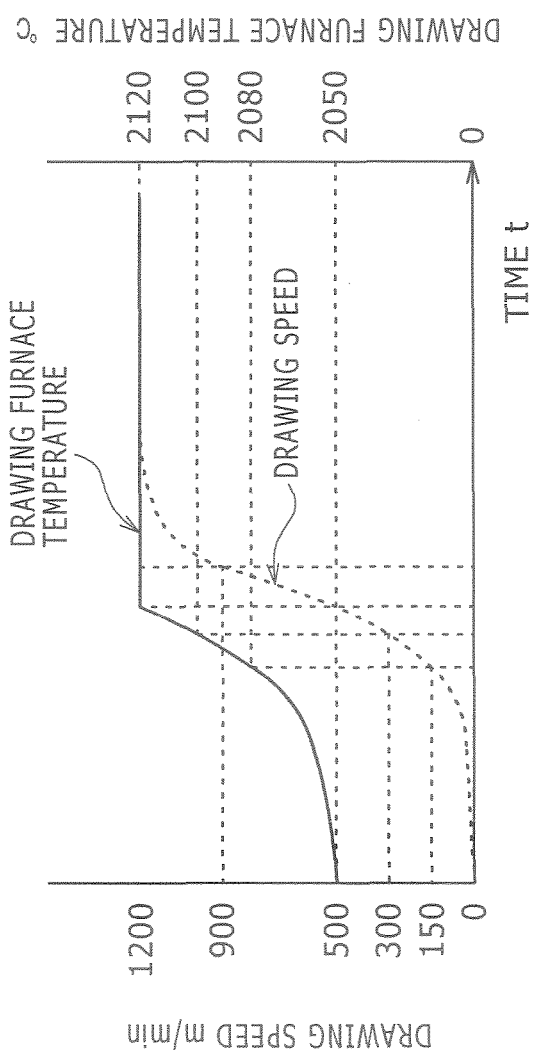
FIG. 17 is a graph illustrating the relation between the drawing speed and the drawing furnace temperature accompanied with the elapsed time, in the optical fiber drawing device relating to the embodiment.
Figure 18:
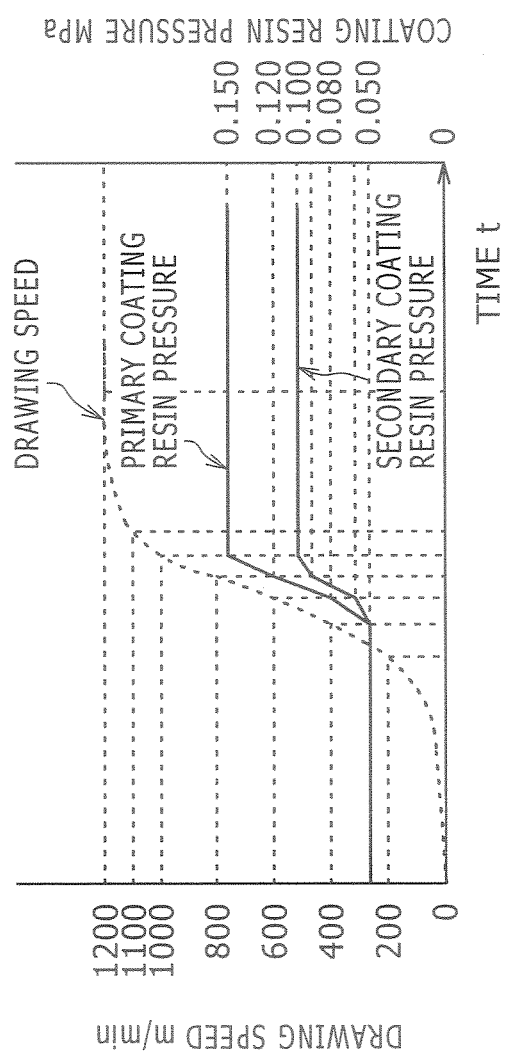
FIG. 18 is a graph illustrating the relation between the drawing speed and the coating resin pressure accompanied with the elapsed time, in the optical fiber drawing device relating to the embodiment.
Figure 19:
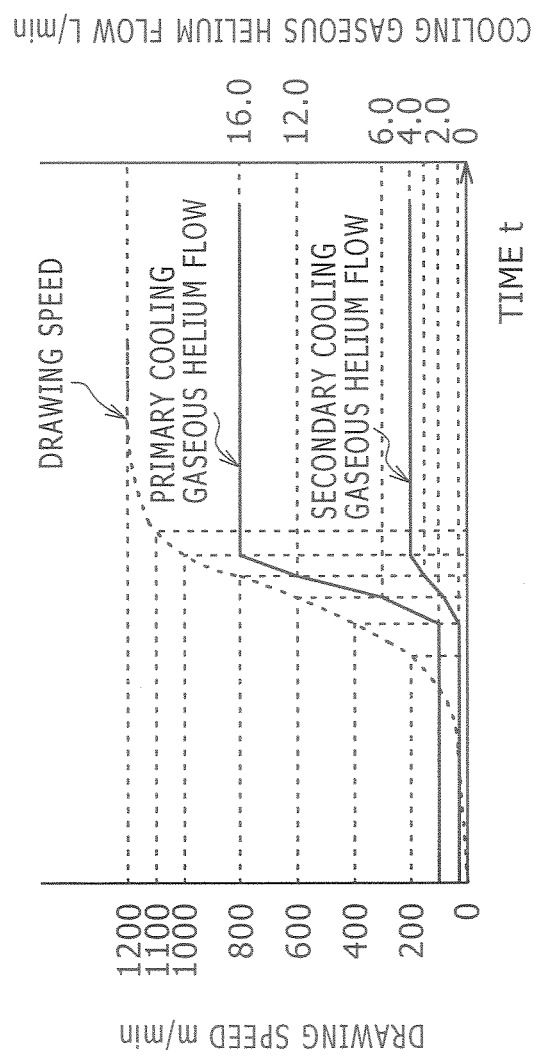
FIG. 19 is a graph illustrating the relation between the drawing speed and the flow of cooling gaseous helium accompanied with the elapsed time, in the optical fiber drawing device relating to the embodiment.

Here, FIG. 17 is a graph illustrating the relation between the real drawing speed and the drawing furnace temperature accompanied with the elapsed time, FIG. 18 is a graph illustrating the relation between the real drawing speed and the coating resin pressure accompanied with the elapsed time, and FIG. 19 is a graph illustrating the relation between the real drawing speed and the flow of cooling gaseous helium accompanied with the elapsed time. As found in FIG. 17 through FIG. 19, the drawing furnace temperature, coating resin pressure, and cooling gaseous helium flow from the moment of starting the operation of the optical fiber drawing device X till the moment of reaching the target drawing speed are the values wherein the variation of the real drawing speed is taken into account.

INDUSTRIAL APPLICABILITY

As the embodiment being thus described, according to the present invention, it is possible to provide an optical fiber drawing device capable of a stable drawing control that does not generate hunting or overshoot or the like, while reducing the start-up fiber length (or speed increasing time) in the unsteady state (transient state) operation of the optical fiber drawing device.

The invention claimed is:

1. An optical fiber drawing device that produces an optical fiber from a preform, comprising:
    a drawing furnace that heats, melts, and draws the preform;
    a preform feeding unit that holds said preform and feeds said preform into said drawing furnace;
    a cooling unit that cools a bare optical fiber drawn by said drawing furnace;
    a coating unit that applies a coating resin to said bare optical fiber;
    a capstan that takes up a coated bare optical fiber;
    a winding unit that winds up an optical fiber strand taken up by the capstan;
    a real drawing speed detection unit that detects a real drawing speed of said optical fiber strand being taken up;
    arithmetic and control means for generating a speed command signal of a preform feeding speed on the basis of a signal of the real drawing speed detected by said real drawing speed detection unit by adopting, as a preform feeding speed, a base preform feeding speed and a feedback correction determined on the basis of a deviation between a target variation of a drawing speed and a variation of the real drawing speed, wherein at least one of said base preform feeding speed and the target variation of the drawing speed is a function of the real drawing speed; and
    a preform feeding speed adjusting unit that adjusts a preform feeding speed by the preform feeding unit, on the basis of the speed command signal;
    further comprising a stepwise storage means that stores stepwise, as a function of said real drawing speed, values of one of said base preform feeding speed and the target variation of the drawing speed, which is set as a function of the real drawing speed, wherein said values stored in the stepwise storage means are extracted as a function of the real drawing speed, and the values extracted are applied.

2. The optical fiber drawing device according to claim 1, wherein said arithmetic and control means determines the preform feeding speed Vf(t) by the below formula (I) and adopts it as the speed command signal:

$$Vf(t)=Vf1+KP(\Delta Vdt\_target-\Delta Vdt)+KI\int(\Delta Vdt\_target-\Delta Vdt)dt \quad (\text{i})$$

wherein,
Vf1: base preform feeding speed
$\Delta Vdt\_target$: target variation of drawing speed
$\Delta Vdt$: variation of real drawing speed
KP: variation proportional gain
KI: variation integral gain
dt: integral control cycle.

3. The optical fiber drawing device according to claim 1, wherein both the base preform feeding speed and the target variation of the drawing speed are a function of said real drawing speed.

4. The optical fiber drawing device according to claim 2, wherein at least one of said KP and said KI is a function of said real drawing speed.

5. The optical fiber drawing device according to claim 2, wherein at least one of the cycle of operating said $KP(\Delta Vdt\_target-\Delta Vdt)$ and said integral control cycle is a function of said real drawing speed.

6. The optical fiber drawing device according to claim 1, further comprising a furnace temperature adjusting unit that controls a temperature of said drawing furnace as a function of said real drawing speed.

7. The optical fiber drawing device according to claim 1, further comprising a coating resin pressure adjusting unit that controls a pressure of a coating resin in said coating unit as a function of said real drawing speed.

8. The optical fiber drawing device according to claim 1, wherein said cooling unit cools by cooling gaseous helium, further comprising a cooling gaseous helium flow adjusting unit that controls a cooling gaseous helium flow in the cooling unit as a function of said real drawing speed.

9. The optical fiber drawing device according to claim 1, wherein the values to be applied are determined by an interpolation calculation as a function of the values extracted from said stepwise storage means.

10. An optical fiber drawing device that produces an optical fiber from a preform, comprising:
   a drawing furnace that heats, melts, and draws the preform;
   a preform feeding unit that holds said preform and feeds said preform into said drawing furnace;
   a cooling unit that cools a bare optical fiber drawn by said drawing furnace;
   a coating unit that applies a coating resin to said bare optical fiber;
   a capstan that takes up a coated bare optical fiber;
   a winding unit that winds up an optical fiber strand taken up by the capstan;
   a real drawing speed detection unit that detects a real drawing speed of said optical fiber strand being taken up;
   arithmetic and control means for generating a speed command signal of a preform feeding speed on the basis of a signal of the real drawing speed detected by said real drawing speed detection unit by adopting, as a preform feeding speed, a base preform feeding speed and a feedback correction determined on the basis of a deviation between a target variation of a drawing speed and a variation of the real drawing speed, wherein at least one of said base preform feeding speed and the target variation of the drawing speed is a function of the real drawing speed; and
   a preform feeding speed adjusting unit that adjusts a preform feeding speed by the preform feeding unit, on the basis of the speed command signal;
   further comprising furnace temperature adjusting means for controlling a temperature of the drawing furnace as a function of said real drawing speed.

11. An optical fiber drawing device that produces an optical fiber from a preform, comprising:
   a drawing furnace that heats, melts, and draws the preform;
   a preform feeding unit that holds said preform and feeds said preform into said drawing furnace;
   a cooling unit that cools a bare optical fiber drawn by said drawing furnace;
   a coating unit that applies a coating resin to said bare optical fiber;
   a capstan that takes up a coated bare optical fiber;
   a winding unit that winds up an optical fiber strand taken up by the capstan;
   a real drawing speed detection unit that detects a real drawing speed of said optical fiber strand being taken up;
   arithmetic and control means for generating a speed command signal of a preform feeding speed on the basis of a signal of the real drawing speed detected by said real drawing speed detection unit by adopting, as a preform feeding speed, a base preform feeding speed and a feedback correction determined on the basis of a deviation between a target variation of a drawing speed and a variation of the real drawing speed, wherein at least one of said base preform feeding speed and the target variation of the drawing speed is a function of the real drawing speed; and
   a preform feeding speed adjusting unit that adjusts a preform feeding speed by the preform feeding unit, on the basis of the speed command signal;
   further comprising coating resin pressure adjusting means for controlling a pressure of a coating resin in said coating unit as a function of said real drawing speed.

12. An optical fiber drawing device that produces an optical fiber from a preform, comprising:
   a drawing furnace that heats, melts, and draws the preform;
   a preform feeding unit that holds said preform and feeds said preform into said drawing furnace;
   a cooling unit that cools a bare optical fiber drawn by said drawing furnace;
   a coating unit that applies a coating resin to said bare optical fiber;
   a capstan that takes up a coated bare optical fiber;
   a winding unit that winds up an optical fiber strand taken up by the capstan;
   a real drawing speed detection unit that detects a real drawing speed of said optical fiber strand being taken up;
   arithmetic and control means for generating a speed command signal of a preform feeding speed on the basis of a signal of the real drawing speed detected by said real drawing speed detection unit by adopting, as a preform feeding speed, a base preform feeding speed and a feedback correction determined on the basis of a deviation between a target variation of a drawing speed and a variation of the real drawing speed, wherein at least one of said base preform feeding speed and the target variation of the drawing speed is a function of the real drawing speed; and
   a preform feeding speed adjusting unit that adjusts a preform feeding speed by the preform feeding unit, on the basis of the speed command signal;
   further comprising cooling gaseous helium flow adjusting means for controlling a cooling gaseous helium flow in said cooling unit as a function of said real drawing speed.

* * * * *